(12) United States Patent
  Na

(10) Patent No.: US 9,143,334 B2
(45) Date of Patent: Sep. 22, 2015

(54) METHOD AND APPARATUS FOR TRANSMITTING GROUP MESSAGE IN UNICAST NETWORK

(75) Inventor: Jeong-Hwan Na, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 509 days.

(21) Appl. No.: 13/326,537

(22) Filed: Dec. 15, 2011

(65) Prior Publication Data
  US 2012/0155248 A1   Jun. 21, 2012

(30) Foreign Application Priority Data
  Dec. 16, 2010   (KR) .......................... 10-2010-0128853

(51) Int. Cl.
  *H04L 12/18*   (2006.01)
(52) U.S. Cl.
  CPC ..................... *H04L 12/185* (2013.01)
(58) Field of Classification Search
  USPC ......... 370/226, 227, 243, 246, 274, 279, 293, 370/315–327, 312, 432, 492, 501
  See application file for complete search history.

(56) References Cited

U.S. PATENT DOCUMENTS

| | | | |
|---|---|---|---|
| 2003/0099221 A1* | 5/2003 | Rhee ............................ | 370/338 |
| 2003/0179721 A1* | 9/2003 | Shurmantine et al. ........ | 370/315 |
| 2004/0132448 A1* | 7/2004 | Torres et al. .................. | 455/427 |
| 2006/0285529 A1* | 12/2006 | Hares et al. .................... | 370/338 |
| 2012/0155248 A1* | 6/2012 | Na .................. | 370/221 |
| 2012/0182860 A1* | 7/2012 | Liu et al. ....................... | 370/216 |

OTHER PUBLICATIONS

Schluting, Networking 101: Understanding Multicast Routing, Jul. 27, 2006, p. 1-2.*
Lee et al., On-Demand Multicast Routing Protocol, 1999, IEEE, p. 1298-1302.*

* cited by examiner

*Primary Examiner* — Hoon J Chung
(74) *Attorney, Agent, or Firm* — Jefferson IP Law, LLP

(57) ABSTRACT

A method and an apparatus for transmitting a group message in a unicast-based network are provided. A method of a terminal for transmitting a group message in a unicast-based network includes when receiving a session connection request message, transmitting a first group notification message for forming a relay group, to other terminals, receiving a second group notification message from at least one other terminal, forming a relay group with the terminal and at least one other terminal corresponding to the second received group notification message, and determining one of the terminals of the relay group as a relay terminal which relays the group message to other terminals in the relay group.

20 Claims, 7 Drawing Sheets

METHOD AND APPARATUS FOR TRANSMITTING GROUP MESSAGE IN UNICAST NETWORK

PRIORITY

This application claims the benefit under 35 U.S.C. §119(a) of a Korean patent application filed in the Korean Intellectual Property Office on Dec. 16, 2010, and assigned Serial No. 10-2010-0128853, the entire disclosure of which is hereby incorporated by reference.

BACKGROUND OF THE INVENTION

1. Field of the Invention

The present invention relates generally to a unicast-based network. More particularly, the present invention relates to relaying data in a unicast-based network.

2. Description of Related Art

A group message service via Internet is typically performed in a manner that a server transmits the same message data to each of the terminals included in the group message. While this method increases load in a server and a network in proportion to the number of terminals involved, its implementation and user management are quite easy. As a result, this method is used in most communication environments.

When such a group message service is provided, a multicast scheme is applied to avoid the repetitive transmission as in the unicast scheme and to efficiently utilize network resources. To use the multicast scheme in a Voice over Internet Protocol (VoIP) system of the related art, all of the routers along the traffic path need to support the multicast protocol and to maintain the transmission tree per session.

However, most of the currently available routers do not support multicast. To apply the multicast scheme, the most adequate method for building the group tree should be selected according to the number, densities, and distribution of transmitters and receivers overall, which may be difficult. Consequently, since it is difficult to apply the multicast transmission to the actual VoIP system environment, an application layer multicast scheme is studied as the alternative.

The application layer multicast scheme relays data between terminals in the application layer, and can reduce the load of the server and prevent the load from concentrating to a particular node or path by distributing the traffic over the network topology. However, since the application layer multicast scheme according to the related art mostly focuses on the multicast effect, it does not offer an efficient method for building the group for the actual group message service.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for dynamically forming a multicast relay group and sending a group message in a unicast-based network.

Another aspect of the present invention is to provide a method and an apparatus for determining a terminal which relays a group message in a unicast-based network.

Another aspect of the present invention is to provide a method and an apparatus for setting a secondary terminal which relays a group message in an exceptional situation in a unicast-based network.

According to an aspect of the present invention, a method of a terminal for transmitting a group message in a unicast-based network is provided. The method includes when receiving a session connection request message, transmitting a first group notification message for forming a relay group, to other terminals, receiving a second group notification message from at least one other terminal, forming a relay group with the terminal and at least one other terminal corresponding to the received second group notification message, and determining one of the terminals of the relay group as a relay terminal which relays the group message to other terminals in the relay group.

According to another aspect of the present invention, an apparatus of a terminal for transmitting a group message in a unicast-based network is provided. The apparatus includes a controller for, when receiving a session connection request message, for transmitting a first group notification message for forming a relay group, to other terminals, for receiving a second group notification message from at least one other terminal, for forming a relay group with the terminal and at least one other terminal corresponding to the received second group notification message, and for determining one of the terminals of the relay group as a relay terminal which relays the group message to other terminals in the relay group, a relay part for receiving unicast data from a server and multicasting the unicast data to the other terminals of the group under control of the controller, and a transceiver for transmitting and receiving signals to and from the server and the other terminals under the control of the controller, and for receiving data multicast from a relay terminal.

In accordance with another aspect of the present invention, a method of a server transmitting a group message in a unicast-based network is provided. The method includes generating data to be broadcast, transmitting a session connect message in a unicast manner to a plurality of terminals which are to transmit the generated data, receiving a session connection request message from at least one of the plurality of terminals, and transmitting the generated data to the at least one terminal in a unicast manner.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus for dynamically forming a multicast relay group and sending a group message in a unicast-based network. A unicast-based Voice over Internet Protocol (VoIP) system is described below by way of example, but exemplary embodiments of the present invention are equally applicable to other unicast-based network systems.

Exemplary embodiments of the present invention are devised based on the point that a multicast packet cannot pass through a gateway in a Local Area Network (LAN) environment, but can be transmitted to other terminals of the same subset in the corresponding network. A particular terminal in the edge network receives unicast broadcasting data and relays the data to other terminals of the same subnet in a multicast manner.

Figure 1:
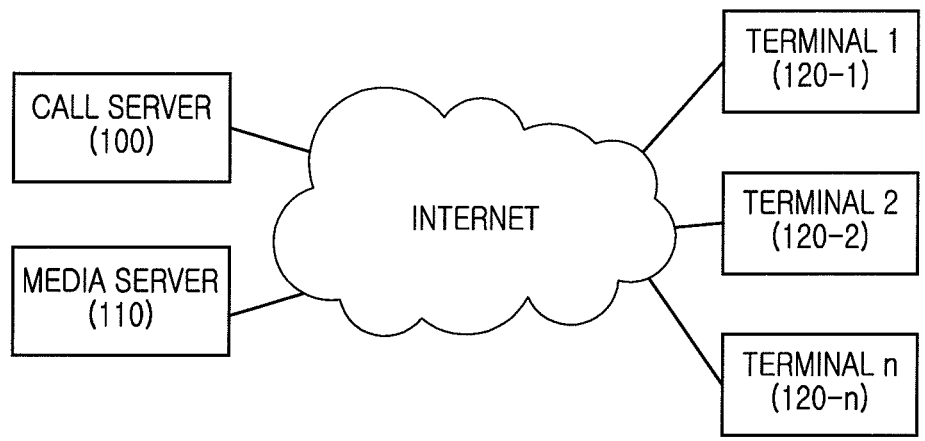
FIG. 1 illustrates a Voice over Internet Protocol (VoIP) system according to an exemplary embodiment of the present invention.

FIG. 1 depicts a VoIP system according to an exemplary embodiment of the present invention.

Referring to FIG. 1, the system includes a call server 100, a media server 110, and a plurality of terminals 120-1 through 120-n.

The call server 100 manages VoIP calls, may include an Internet Protocol (IP)-Private Branch Exchange (PBX), a Session Initiation Protocol (SIP) server, and a H.233 gatekeeper according to the type of the supported protocol, and may be divided into a business environment and a domestic environment based on the network environment. Exemplary embodiments of the present invention are also applicable to other types of call servers.

The media server 110 controls and processes to transmit various multimedia data to the terminal. When the broadcasting data to send to the terminal is generated, the media server 110 sends a session connection request message to the corresponding terminals and receives a broadcasting data request message from at least one of the corresponding terminals. The media server 110 unicasts the broadcasting data to the at least one terminal which requests the broadcasting data.

The terminals 120-1 through 120-n receive the VoIP call service from the call server 100, and receive the broadcasting service from the media server 110. The terminals 120-1 through 120-n dynamically form the multicast relay group by receiving the session connection request message from the media server 110, directly designate the relay terminal in the formed relay group, and then receive the broadcasting data from the media server 110 through the relay function of the designated relay terminal.

While the media server 110 sends the broadcasting session request message to the terminals 120-1 through 120-n and receives the broadcasting data request message, the call server 100 and the media server 110 may be connected to the backhaul according to their design and the call server 100 may send and receive messages for carrying the broadcasting data of the media server 110. Accordingly, a server may include either or both the call server and the media server.

Figure 2:
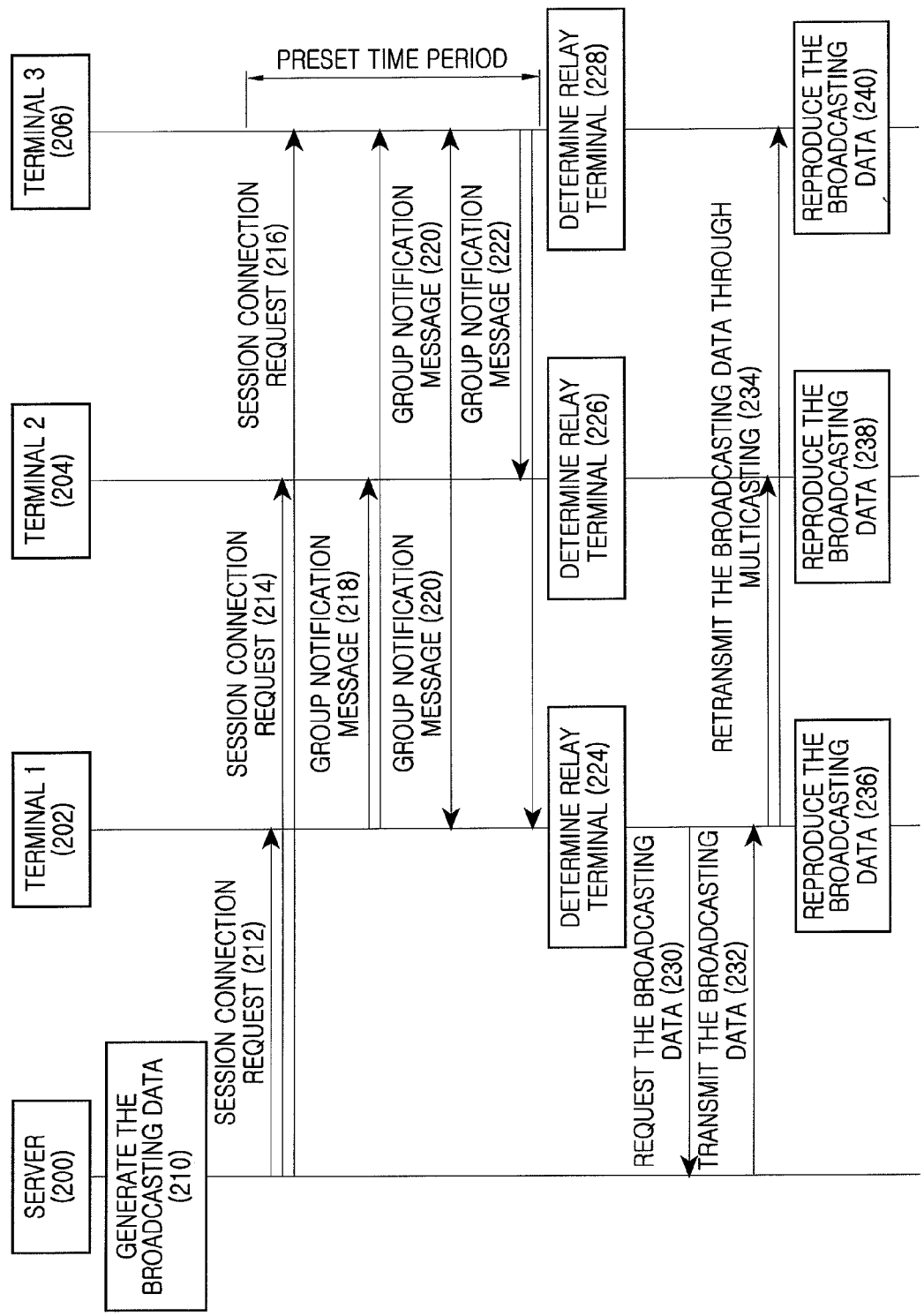
FIG. 2 illustrates signal sequences for providing a group message service in a unicast-based network according to an exemplary embodiment of the present invention.

FIG. 2 illustrates signal sequences for providing a group message service in a unicast-based network according to one exemplary embodiment of the present invention. While three terminals are described to ease understanding, exemplary embodiments of the present invention are equally applicable to three or more terminals.

Referring to FIG. 2, when the broadcasting data is generated in step 210, a server 200 sends the session connection request message to terminals 202, 204, and 206, which receive the broadcasting data in steps 212, 214, and 216.

The terminals 202, 204, and 206 receiving the session connection request message broadcast a group notification message in steps 218, 220, and 222. The group notification message is transmitted and received to form the group with the terminals to relay the broadcasting data, and may include an IDentifier (ID), a phone number, a model name, hardware performance factors (e.g., Central Processing Unit (CPU) performance, remaining memory capacity, and idle time information), and message transmission time information of the corresponding terminal. In so doing, the group notification message is transmitted within a preset time period after the session connection request message is received. To avoid collisions of the group notification messages of the terminals 202, 204, and 206, the terminals 202, 204, and 206 may randomly send the group notification message within the preset time period.

The terminals 202, 204, and 206 receiving the session connection request message may generate a multicast address using information of the session connection request message, and set the multicast address in a network interface card. For example, the terminals 202, 204, and 206 may select the same information transmitted to all of the terminals among information such as session ID, broadcasting title, and broadcasting time in the session connection request message, and then may set the multicast address by combining the selected information and a multicast prefix address. The multicast address may be determined by the server and delivered by the session connection request message, or a predefined multicast address can be used. The predefined multicast address is applicable when the server sends only one message at a time.

The terminals 202, 204, and 206 receive the group notification message of other terminals and recognize the other terminals as the same group terminals in steps 218, 220, and 222, and determine the terminal for relaying the broadcasting data based on the group notification message received from the terminals of the same group in steps 224, 226, and 228. For example, based on the message transmission time in the group notification message, the terminals 202, 204, and 206 may determine the terminal sending the group notification message first as the relay terminal or determine the terminal of the best hardware performance as the relay terminal. The terminals 202, 204, and 206 may weigh various hardware performance factors and determine the terminal with the highest value as the relay terminal, or determine a terminal as the relay terminal based on an IP address or the ID in a preset manner. In the exemplary embodiments described herein, it is assumed that the first terminal 202 is determined as the relay terminal through the above relay terminal determination.

The first terminal 202 determined as the relay terminal sends a message requesting the broadcasting data to the server 200 in step 230. According to the request of the first terminal 202, the server 200 transmits the broadcasting data generated in step 210 to the first terminal 202 in step 232. The broadcasting data is unicast to the first terminal 202.

Figure 4:
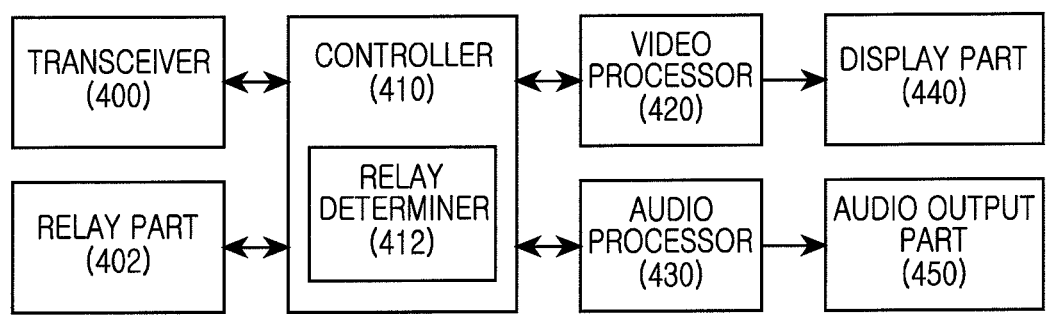
FIG. 4 illustrates a terminal according to an exemplary embodiment of the present invention.

In step 234, the first terminal 202 converts the unicast packet including the broadcasting data received from the server 200 to the multicast packet and sends the multicast packet to the terminals 204 and 206 of the same group. Since the terminals 204 and 206 in the same group as the first terminal 202 have the same multicast address, the first terminal 202 sends the multicast packet including the broadcasting data to the terminals 204 and 206 of the same group based on the multicast address set as above. The multicast packet is broadcast over a Local Area Network (LAN) and concurrently transmitted to the terminals 204 and 206 of the group having the same multicast address. The relay terminal 202 may also receive its multicast packet through a separate relay part as shown in FIG. 4. The relay terminal 202 conducts the relay function through the separate relay part and receives the multicast packet through the existing transceiver so that a user can listen to or watch the broadcasting data regardless of the relay function.

In steps 236, 238, and 240, the terminals 202, 204, and 206 reproduce the broadcasting data. Since the broadcasting data is real-time data, the terminals 202, 204, and 206 do not retransmit data or control errors.

While the first terminal 202 is shown as transmitting the broadcasting data received from the server 200 to the terminals of the group and reproducing the broadcasting data, the reproducing of the broadcasting data and the transmitting of the broadcasting data to the terminals of the group may be performed simultaneously or in any order.

Figure 3:
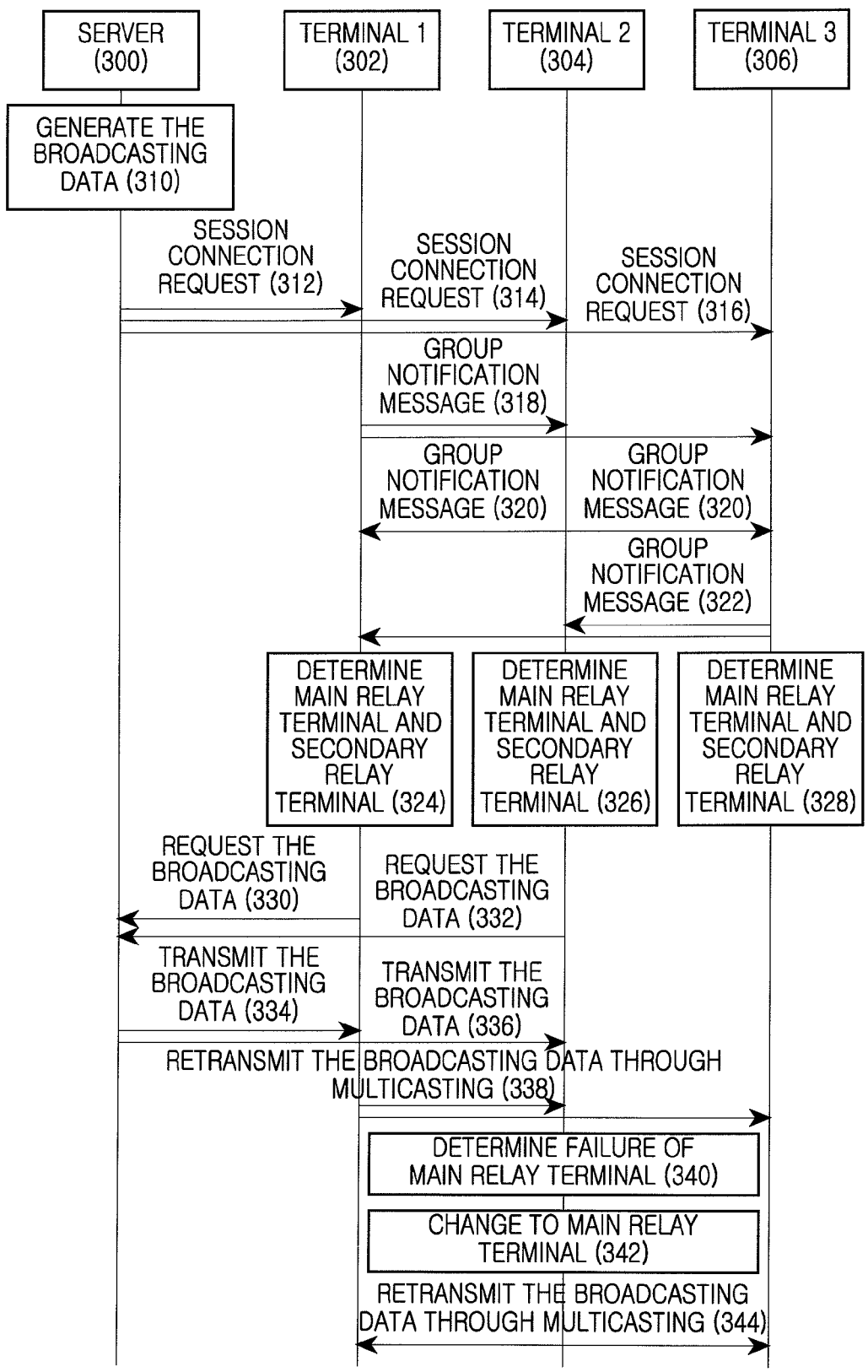
FIG. 3 illustrates signal sequences for providing a group message service in the unicast-based network according to an exemplary embodiment of the present invention.

FIG. 3 illustrates signal sequences for providing a group message service in a unicast-based network according to another exemplary embodiment of the present invention. While three terminals are described to ease understanding, exemplary embodiments of the present invention are applicable to three or more terminals. As steps 310 through 322 are the same as steps 210 through 222 of FIG. 2, their descriptions are omitted.

Referring to FIG. 3, terminals 302, 304, and 306 receive the group notification messages of other terminals and recognize the other terminals as the terminals of the same group in steps 318, 320, and 322, and determine a main relay terminal and a secondary relay terminal for relaying the broadcasting data based on the group notification messages received from the terminals of the same group in steps 324, 326, and 328. The main relay terminal indicates a terminal which receives the broadcasting data from the server 300 and multicasts the broadcasting data to the terminals of the group. The secondary relay terminal indicates a terminal which receives the broadcasting data from the server 300 and transmits the broadcasting data to the terminals of the group in place of the main relay terminal when the main relay terminal cannot multicast the broadcasting data.

The main relay terminal may be determined in the same manner as the relay terminal determination of FIG. 2, and the secondary relay terminal may be determined as a terminal of a second priority when the main relay terminal is determined. For example, the secondary relay terminal may be determined as the terminal which sends the group notification message second, the terminal having the second best hardware performance, or the terminal of the second highest value according to the hardware performance factors. Herein, it is assumed that the first terminal 302 is determined as the main relay terminal and the second terminal 304 is determined as the secondary relay terminal through the relay terminal determination described above.

The first terminal 302 determined as the main relay terminal and the second terminal 304 determined as the secondary relay terminal send a message requesting the broadcasting data to the server 300 in steps 330 and 332. According to the request of the first terminal 302, the server 300 transmits the broadcasting data generated in step 310 to the first terminal 302 and the second terminal 304 in steps 334 and 336. The broadcasting data is unicast to the first terminal 302 and the second terminal 304.

In step 338, the first terminal 302 converts the unicast packet including the broadcasting data received from the server 300 to the multicast packet and sends the multicast packet to the terminals 304 and 306 of the same group. Since the terminals 304 and 306 in the same group as the first terminal 302 have the same multicast address, the first terminal 302 transmits the multicast packet including the broadcasting data to the terminals 304 and 306 of the same group based on the multicast address as mentioned above. Accordingly, the terminals 304 and 306 of the group can receive the multicast packet based on their multicast address.

The second terminal 304 determined as the secondary relay terminal receives the broadcasting data unicast from the server 300 in step 336 and receives the broadcasting data multicast from the first terminal 302. In step 340, the second terminal 304 determines whether the first terminal 302 cannot multicast the broadcasting data because of failure by inspecting the multicast packet received from the first terminal 302. When the second terminal 304 does not receive more than a certain number of packets from the first terminal 302 over a certain time, the second terminal 304 may determine a failure in the first terminal 302.

Upon determining the failure of the first terminal 302, the second terminal 304 changes to the main relay terminal in step 342 and multicasts the broadcasting data received from the server 300 to the terminals 302 and 306 of the group in step 344. Accordingly, the terminals in the group can normally receive and reproduce the broadcasting data even when the main relay terminal has failed.

FIG. 4 is a block diagram of a terminal according to an exemplary embodiment of the present invention.

Referring to FIG. 4, the terminal includes a transceiver 400, a relay part 402, a controller 410, a video processor 420, an audio processor 430, a display part 440, and an audio output part 450. The controller 410 includes a relay determiner 412. The terminal may also include additional units not shown for purposes of clarity. Similarly, the functionality of two or more of the above units may be integrated into a single component. In addition, while the above units may be implemented as hardware or software, it would be understood that some of the units of the terminal would need to be implemented at least partially in hardware in order to carry out their function.

The transceiver 400 sends and receives messages to and from an external device using the network interface card under control of the controller 410. The network interface card may include a network card, a LAN card, an Ethernet card, an Ethernet adaptor, and so on. Under the control of the controller 410, the transceiver 400 receives and forwards the multicast packet of the multicast address to the controller 410. Under the control of the controller 410, the relay part 402 receives the unicast packet from the server using the network interface card, converts the received unicast packet to the multicast packet, and sends the multicast packet.

The controller 410 controls and processes the operations of the terminal. Upon receiving the session request message from the server, the controller 410 controls and processes to set the multicast address based on the information of the session request message.

The relay determiner 412 of the controller 410, upon receiving the session request message, generates the group notification message and controls and processes to broadcast or the multicast the message. When receiving the group notification message from the other terminals, the relay determiner 412 recognizes the other terminals as the terminals of the same group and determines the main relay terminal and the secondary relay terminal in the group.

The main relay terminal and the secondary relay terminal may be determined using the group notification message transmission time, the hardware performance, the IP address, or the ID. When the terminal is determined as the main relay terminal, the relay determiner 412 drives the relay part 402 to receive the unicast packet including the broadcasting data from the server, and controls and processes to convert the received unicast packet to the multicast packet and to send the multicast packet to the other terminals of the group. When the terminal is determined as the secondary relay terminal, the relay determiner 412 drives the relay part 402 to receive the unicast packet including the broadcasting data from the server and monitors whether the multicast packet is normally received from the main relay terminal in the group. When the multicast packet is not received from the main relay terminal in the group normally, the relay determiner 412 controls and processes to change the terminal to the main relay terminal, to convert the unicast packet received from the server to the multicast packet, and to send the multicast packet to the other terminals of the group.

The video processor 420 outputs video data output from the controller 410 in accordance with characteristics and size of the display part 440. The video processor 420 includes a video codec that encodes a video signal or decodes the encoded frame video data to the original video data in a predefined manner. The display part 440 displays various state information, numbers, characters, and images generated during the operation of the terminal. The display part 440 displays the video signal output from the video processor 420 in a screen.

The audio processor 430 converts a digital audio signal output from the controller 410 to an analog audio signal and outputs the analog audio signal to the audio output part 450. The audio output part 450 outputs various audio signals generated during the operation of the terminal. In particular, the audio output part 450 outputs the audio signal fed from the audio processor 420 through a speaker.

Figure 5:
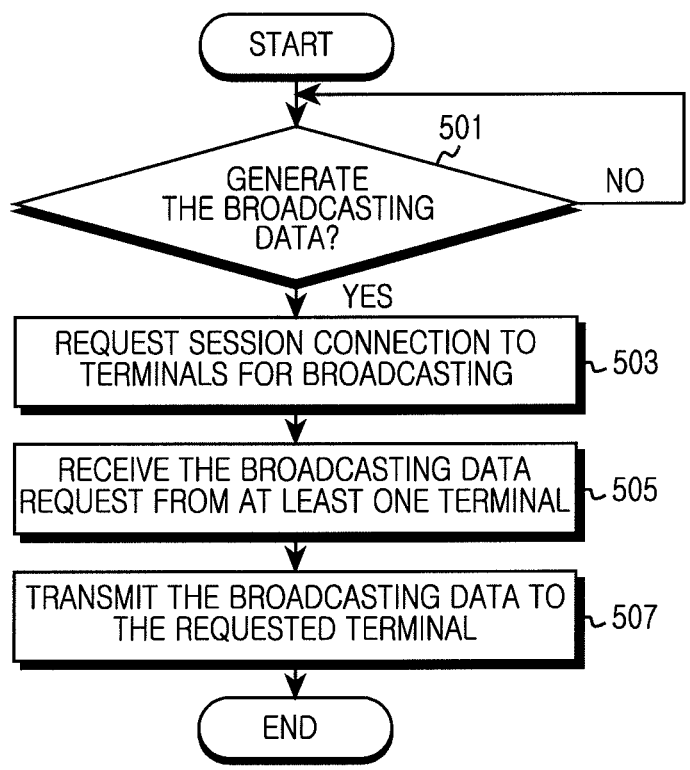
FIG. 5 illustrates operations of a server according to an exemplary embodiment of the present invention.

FIG. 5 illustrates operations of a server according to an exemplary embodiment of the present invention.

Referring to FIG. 5, when the broadcasting data is generated in step 501, the server sends the session connection request message to the terminals which are to transmit the generated broadcasting data in step 503. The session request message is unicast to each terminal.

The server receives the broadcasting data request message from at least one of the terminals sending the session connection request message in step 505, and transmits the broadcasting data to the terminal which sends the request message in step 507. The broadcasting data is unicast.

Figure 6A:
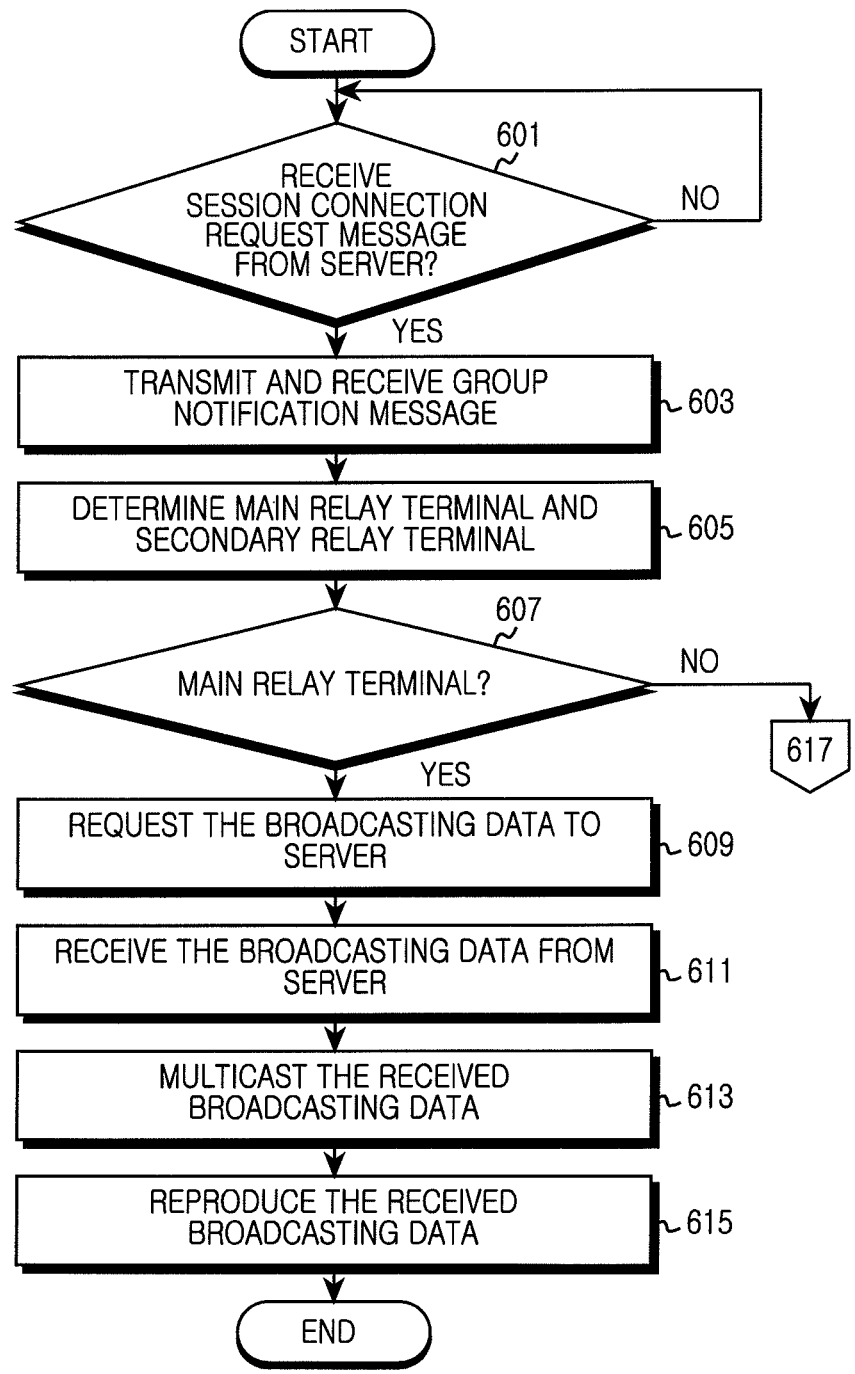
FIGS. 6A and 6B illustrate operations of the terminal according to an exemplary embodiment of the present invention.
Figure 6B:
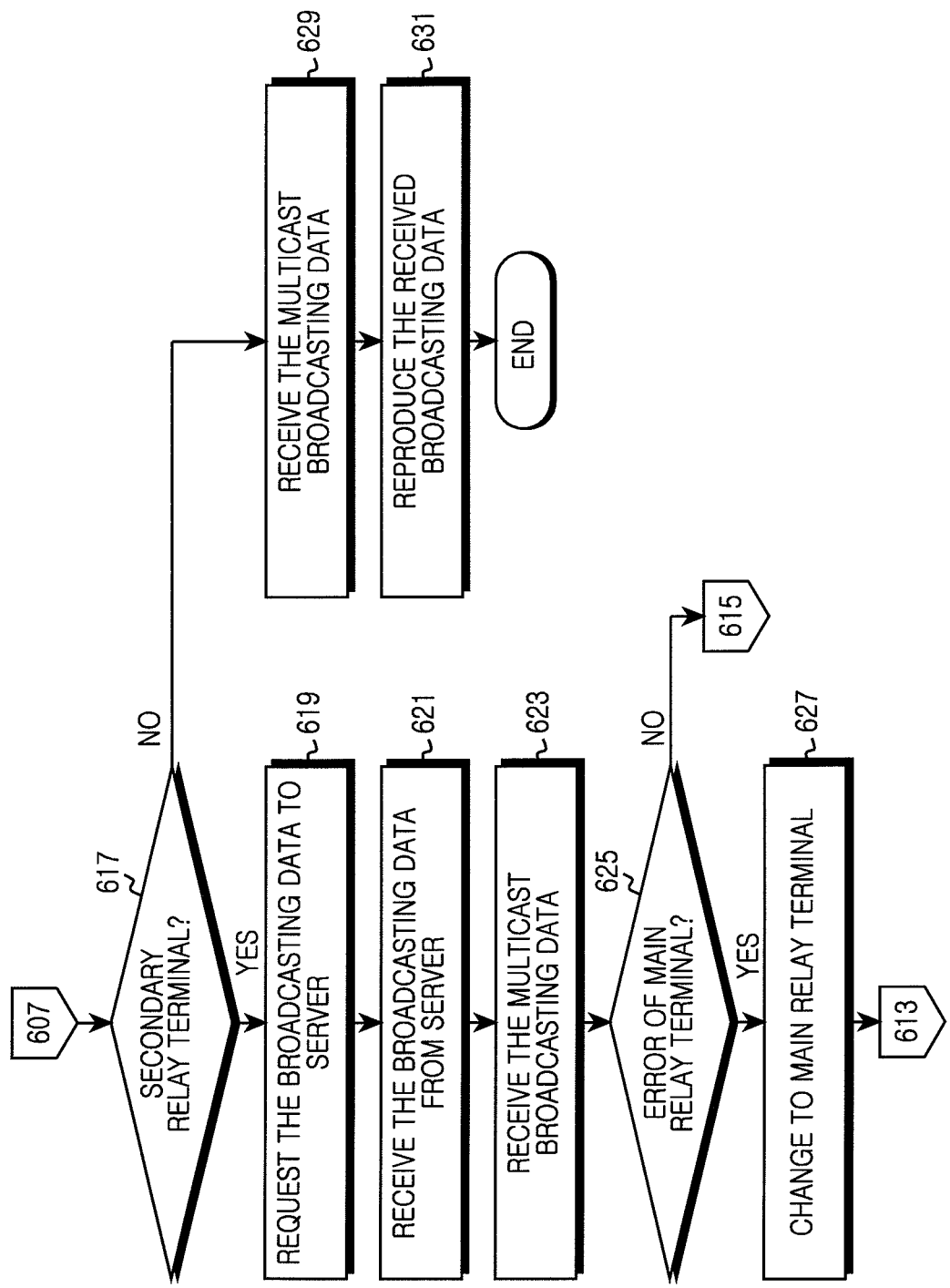

FIGS. 6A and 6B illustrate operations of a terminal according to an exemplary embodiment of the present invention.

Referring to FIG. 6A, the terminal receives the session connection request message from the server in step 601. The session connection request message may be received from the media server or the call server.

Upon receiving the session connection request message, the terminal broadcasts or multicasts the broadcasting notification message and receives the broadcasting notification message from the other terminal in step 603. The group notification message is transmitted and received to form the group between the terminals to relay the broadcasting data, and may include the ID, the phone number, the model name, the hardware performance factors (e.g., CPU performance, remaining memory capacity, and idle time information), and the message transmission time information of the corresponding terminal. The group notification message may be randomly transmitted within a preset time period after the session connection request message is received.

While the terminal may use the preset multicast address for the multicasting, the terminal may set the multicast address using the information in the received session connection request message. The terminal may set the multicast address by selecting the same information transmitted to every terminal, for example, the information such as session ID, broadcasting title, and broadcasting time, of the information in the session connection request message. The multicast address may be determined by the server and then carried by the session connection request message.

In step 605, the terminal recognizes itself and the terminals receiving the group notification message as the relay group, and determines the main relay terminal and the secondary relay terminal from the terminals of the group. The main relay terminal indicates the terminal which receives the broadcasting data from the server and multicasts the broadcasting data to the terminals of the group, and the secondary relay terminal indicates the terminal which receives the broadcasting data from the server and transmits the broadcasting data to the terminals of the group in place of the main relay terminal when the main relay terminal cannot multicast the broadcasting data. The terminal may determine the main relay terminal and the secondary relay terminal based on the information of the group notification message. For example, the terminal which sends the group notification message first based on the transmission time of the group notification message may be determined as the relay terminal, and the terminal which sends the group notification message second may be determined as the secondary relay terminal. The terminal having the best hardware performance may be determined as the main relay terminal and the terminal of the second best hardware performance may be determined as the secondary relay terminal. The terminal having the highest hardware performance value may be determined as the main relay terminal and the terminal of the second highest value may be determined as the secondary relay terminal. The main relay terminal and the secondary relay terminal may also be determined based on IP address or ID.

In step 607, the terminal determines whether it is the main relay terminal. When the terminal is the main relay terminal, the terminal sends the message requesting the broadcasting data to the server in step 609 and then receives the unicast packet including the broadcasting data from the server in step 611. The terminal converts the received unicast packet to the multicast packet and multicasts the multicast packet to the other terminals of the group in step 613, and reproduces the received broadcasting data in step 615. The terminal may reproduce the broadcasting data received from the server, or receive and reproduce its multicast packet. The multicast packet is broadcast over the LAN to the terminals of the group having the same multicast address at the same time. Thus, all of the terminals in the group may receive and reproduce the same broadcasting data.

Referring to FIG. 6B, when the terminal is not the main relay terminal, the terminal determines whether the terminal is the secondary relay terminal in step 617. When the terminal is the secondary relay terminal, the terminal sends the message requesting the broadcasting data to the server in step 619 and then receives the unicast packet including the broadcasting data from the server in step 621. The terminal receives the broadcasting data multicast from the main relay terminal of the group in step 623.

In step 625, the terminal determines whether the main relay terminal has failed. The terminal may determine that the main relay terminal has failed when the terminal determines that the main relay terminal cannot relay the broadcasting data. For example, when the terminal does not receive the multicast packet from the main relay terminal over a certain time or when the terminal does not receive the multicast packet a certain number of times within a certain time, the terminal may determine that the main relay terminal has failed.

When the main relay terminal has not failed, the terminal reproduces the multicast broadcasting data in step 615.

When the main relay terminal has failed, the terminal changes itself to the main relay terminal in step 627, converts the broadcasting data of the unicast packet received from the server to the multicast packet in step 613, and multicasts the multicast packet to the other terminals of the group in step 615.

When the terminal is not the secondary relay terminal in step 617, the terminal receives the broadcasting data multicast from the main relay terminal of the group in step 629 and reproduces the received broadcasting data in step 631.

In the unicast-based network, the terminal for relaying the group message is determined, and the relay terminal receives the unicast data from the server and multicasts the unicast data to the terminals of the group. Accordingly, it is possible to efficiently provide the group message service without separately modifying the network architecture and the server of the related art, and to gain advantages in terms of cost without requiring additional equipment. Since the relay terminal is dynamically determined according to the state of each terminal, abrupt increases in load may be prevented compared to the fixed relay terminal, and the stability of the whole system can be enhanced by preventing the unstable service resulting from the unexpected error.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a terminal for transmitting a group message in a unicast-based network, the method comprising:

when receiving a session connection request message from a server, transmitting a first group notification message for forming a relay group to other terminals;

receiving a second group notification message from at least one other terminal that receives the session connection request message from the server;

forming the relay group with the terminal and the at least one other terminal corresponding to the received second group notification message; and determining one of the terminals of the relay group as a relay terminal which relays the group message to other terminals in the relay group.

2. The method of claim 1, wherein the first group notification message and the second group notification message are randomly transmitted within a certain time after the session connection request message is received, wherein the at least one other terminal transmits the second group notification message to other terminals in response to the session connection request message received from the server.

3. The method of claim 1, wherein the first and second group notification messages comprise at least one of an IDentifier (ID), a phone number, a model name, a hardware performance factor, and message transmission time information of the corresponding terminal.

4. The method of claim 3, wherein the relay terminal which relays the group message is determined based on information obtained from the first and the second group notification message.

5. The method of claim 1, wherein the first group notification message is transmitted to the other terminals using at least one of a broadcast scheme and a multicast scheme.

6. The method of claim 5, wherein a multicast address of the first group notification message is generated based on a preset address, an address in the session connection request message, and the same information transmitted to every terminal among information in the session connection request message.

7. The method of claim 6, wherein the multicast address is set in a network interface card.

8. The method of claim 1, further comprising:

when the one of the terminals of the relay group is determined as the relay terminal, requesting data from a server;

receiving the data from the server; and multicasting the received data to terminals of the relay group.

9. The method of claim 8, wherein the determining of the relay terminal comprises:

determining the relay terminal which relays the group message as a main relay terminal; and determining a secondary relay terminal which relays the group message in place of the relay terminal when a failure occurs in the main relay terminal.

10. The method of claim 9, further comprising:

when another one of the terminals of the relay group is determined as the secondary relay terminal, requesting the data from the server;

receiving the data from the server;

monitoring data multicast from the main relay terminal;

determining whether a failure occurs in the main relay terminal based on the results of the monitoring; and when the failure occurs in the main relay terminal, multicasting the data received from the server to the terminals of the relay group in place of the main relay terminal.

11. An apparatus of a terminal for transmitting a group message in a unicast-based network, the apparatus comprising:
- a controller for, when receiving a session connection request message from a server, transmitting a first group notification message for forming a relay group, to other terminals, for receiving a second group notification message from at least one other terminal that receives the session connection request message from the server, for forming the relay group with the terminal and at least one other terminal corresponding to the received second group notification message, and for determining one of the terminals of the relay group as a relay terminal which relays the group message to other terminals in the relay group;
- a relay part for receiving unicast data from a server and for multicasting the unicast data to the other terminals of the relay group under the control of the controller; and
- a transceiver for transmitting and receiving signals to and from the server and the other terminals under the control of the controller, and for receiving data multicast from the relay terminal.

12. The apparatus of claim 11, wherein the first group notification message and the second group notification message are randomly transmitted within a certain time after the session connection request message is received,
wherein the at least one other terminal transmits the second group notification message to other terminals in response to the session connection request message received from the server.

13. The apparatus of claim 11, wherein the first and second group notification messages comprise at least one of an IDentifier (ID), a phone number, a model name, a hardware performance, and message transmission time information of the corresponding terminal.

14. The apparatus of claim 13, wherein the relay terminal which relays the group message is determined based on the information obtained from the first and second group notification message.

15. The apparatus of claim 11, wherein the first group notification message is transmitted to the other terminals using at least one of a broadcast scheme and a multicast scheme.

16. The apparatus of claim 15, wherein a multicast address of the first group notification message is generated based on a preset address, an address in the session connection request message, and the same information transmitted to every terminal among information in the session connection request message.

17. The apparatus of claim 16, wherein the multicast address is set in a network interface card.

18. The apparatus of claim 11, wherein, when the one of the terminals of the relay group is determined as the relay terminal, the relay part requests the unicast data from the server under the control of the controller, receives the unicast data from the server, and multicasts the received unicast data to the other terminals of the relay group.

19. The apparatus of claim 18, wherein the controller determines the relay terminal which relays the group message, and determines a secondary relay terminal which relays the group message in place of the relay terminal when a failure occurs in the relay terminal.

20. The apparatus of claim 19, wherein, when another one of the terminals of the relay group is determined as the secondary relay terminal, the relay part requests the unicast data from the server and receives the unicast data from the server under the control of the controller, and
the controller monitors the data multicast from the relay terminal through the transceiver and determines whether a failure occurs in the relay terminal based on results of the monitoring, and controls the relay part to multicast the unicast data received from the server to the terminals of the relay group in place of the relay terminal when the failure occurs in the relay terminal.

\* \* \* \* \*